US009738334B2

(12) United States Patent
Talbot et al.

(10) Patent No.: US 9,738,334 B2
(45) Date of Patent: Aug. 22, 2017

(54) TRACK SHOE HAVING INCREASED SERVICE LIFE USEFUL IN A TRACK DRIVE SYSTEM

(71) Applicants: Claude Pierre Talbot, Shannon (CA); Alma Olsen, Parna, ID (US)

(72) Inventors: Claude Pierre Talbot, Shannon (CA); Alma Olsen, Parna, ID (US)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 14/270,916

(22) Filed: May 6, 2014

(65) Prior Publication Data

US 2015/0375813 A1 Dec. 31, 2015
US 2017/0021878 A9 Jan. 26, 2017

Related U.S. Application Data

(60) Provisional application No. 61/820,551, filed on May 7, 2013.

(51) Int. Cl.
*B62D 55/20* (2006.01)
*B62D 55/21* (2006.01)
(Continued)

(52) U.S. Cl.
CPC ........... *B62D 55/202* (2013.01); *B62D 55/21* (2013.01); *B62D 55/28* (2013.01); *B62D 55/32* (2013.01);
(Continued)

(58) Field of Classification Search
CPC ...... B62D 55/202; B62D 55/21; B62D 55/28; B62D 55/32
See application file for complete search history.

(56) References Cited

U.S. PATENT DOCUMENTS 1,290,586 A * 1/1919 Lambert .............. B62D 55/205
305/198
1,474,967 A * 11/1923 Heine .................... B62D 55/28
305/111
(Continued)

FOREIGN PATENT DOCUMENTS

RU 2204622 C2 5/2003
RU 2278052 C2 6/2006
(Continued)

OTHER PUBLICATIONS

MECASTEEL 145 (Prehardened High-Strength Steel), Feb. 2014, ASM International, Alloy Digest, pp. 1-2.*
(Continued)

*Primary Examiner* — Kip T Kotter
(74) *Attorney, Agent, or Firm* — Davidson, Davidson & Kappel, LLC

(57) ABSTRACT

A track shoe for a track drive system, which comprises a shoe base, one or more drive lugs attached to the shoe base, and a wear plate attached to the shoe base. The shoe base and drive lugs may be formed from a prehardened engineering steel, such as MECASTEEL 145. The wear plate may be formed from MECASTEEL 145 or an advanced abrasion-resistant steel, such as Creusabro 8000. The drive lugs may be replaceably attached to the shoe base, preferably by welding. The wear plate may be replaceably attached to the shoe base, preferably by fasteners such as bolts.

18 Claims, 5 Drawing Sheets

(51) Int. Cl.
  *B62D 55/28* (2006.01)
  *B62D 55/32* (2006.01)
  *C22C 38/38* (2006.01)
  *C22C 38/44* (2006.01)
  *C22C 38/46* (2006.01)
(52) U.S. Cl.
  CPC ............. *C22C 38/38* (2013.01); *C22C 38/44* (2013.01); *C22C 38/46* (2013.01)

(56) References Cited

U.S. PATENT DOCUMENTS

| | | | | |
|---|---|---|---|---|
| 3,307,882 A * | 3/1967 | McFayden | ............ | B62D 55/28 29/402.13 |
| 3,333,903 A * | 8/1967 | Orr | ............ | B62D 55/20 305/195 |
| 4,139,240 A * | 2/1979 | Profio | ............ | B62D 55/062 29/891.1 |
| 6,220,378 B1 * | 4/2001 | Oertley | ............ | B62D 55/12 180/9.62 |
| 7,462,251 B2 * | 12/2008 | Beguinot | ............ | C21D 1/19 148/547 |
| 7,530,650 B2 * | 5/2009 | Hannan | ............ | B62D 55/20 305/196 |
| 7,713,362 B2 * | 5/2010 | Beguinot | ............ | C21D 1/19 148/320 |
| 2005/0169790 A1 * | 8/2005 | Zand | ............ | C22C 38/46 420/84 |
| 2010/0003162 A1 * | 1/2010 | Arrenbrecht | ............ | C21D 9/12 420/109 |
| 2011/0104513 A1 | 5/2011 | Maggioli et al. | | |
| 2015/0184270 A1 * | 7/2015 | Ueda | ............ | C22C 38/001 148/645 |

FOREIGN PATENT DOCUMENTS

| | | |
|---|---|---|
| RU | 62885 U1 | 5/2007 |
| RU | 2332323 C1 | 8/2008 |
| WO | 98/20180 A1 | 5/1998 |

OTHER PUBLICATIONS

CREUSABRO 8000 (A high performance wear resistant steel), Nov. 14, 2001, http://www.multialloy.com.br/ing/produtos/pdf/Creusabro_8000.pdf, pp. 1-8.*
International Search Report for International Application No. PCT/US2014/037089 dated Jul. 31, 2014.

* cited by examiner

TRACK SHOE HAVING INCREASED SERVICE LIFE USEFUL IN A TRACK DRIVE SYSTEM

CROSS-REFERENCE TO RELATED APPLICATIONS

This Application claims the benefit under 35 U.S.C. 119(e) of U.S. Provisional Application No. 61/820,551 filed May 7, 2013.

FIELD OF THE INVENTION

This invention relates to a track shoe for a crawler track. In particular, the invention is directed to a crawler track shoe for an electric mining shovel, although the invention is not limited to that particular use.

BACKGROUND OF THE INVENTION

Some items of large mining machinery, such as excavators and shovels, are fitted with crawler tracks for locomotion. In vehicles driven by endless crawler tracks such as surface mining shovels, excavators, bulldozers and tanks the crawler tracks include a series of links which are linked together by pins to form an endless articulated track, each track being mounted on support rollers with sprockets at either end. These tracks allow the machine to move along a ground surface.

The individual links of the crawler tracks are known as "shoes". The track shoes must support a heavy weight, and are subject to high pressures. Further, the tracks are often required to operate in harsh conditions, such as stony or rock-strewn ground and low temperatures.

Presently, track shoes for heavy vehicles such as the Bucyrus 495 Mining Shovel are formed from cast steel which may be induction hardened where needed. The OEM manufacturers expected lifetime for such a track shoe is about 28,000 service hours. However, the present inventors have found that their actual average lifetime is about only 10,000 service hours. They have also found that the failure mode on such a part is more structural than wear related. Each shoe, which is 79 inches wide and weighs 3400 lbs., cost approximately $20,000. For the Bucyrus 495 Mining Shovel there are 47 of such shoes per side, for a total of 94 shoes. This adds up to a total cost of $1.88 million for each machine. The replacement costs for the track shoes on the 5 shovels operating at Mount-Wright mine is about $5 million per year, or about $200 per shovel operating hour.

Thus, there is a need in the art for a track shoe with increased service life.

SUMMARY OF THE INVENTION

The present invention is a track shoe for a track drive system, which comprises a shoe base, one or more drive lugs attached to the shoe base, and a wear plate attached to the shoe base. The shoe base and drive lugs may be formed from a prehardened engineering steel, such as MECASTEEL 145. The drive lugs may be replaceably attached to the shoe base, preferably by welding. The wear plate may be replaceably attached to the shoe base, preferably by fasteners such as bolts. The wear plate may be formed from MECASTEEL 145 or an advanced abrasion-resistant steel, such as Creusabro 8000.

DETAILED DESCRIPTION OF THE INVENTION

Figure 1:
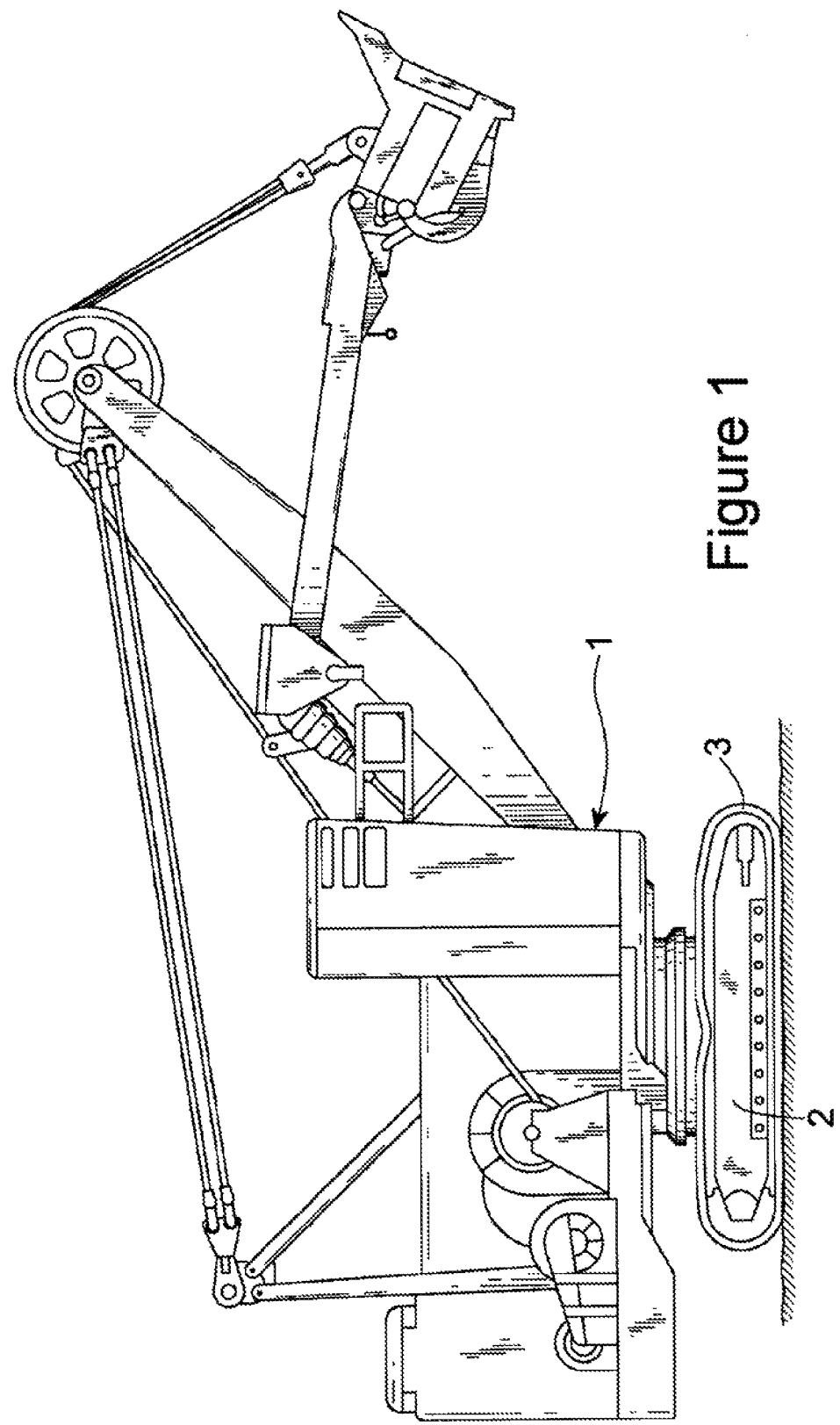
FIG. 1 depicts a stylized drawing of a piece of mining equipment of the type for which the present invention would be useful, specifically an Electric Rope Shovel.

FIG. 1 depicts a stylized drawing of a piece of mining equipment of the type for which the present invention would be useful, specifically an Electric Rope Shovel 1. The shovel 1 is driven by endless crawler track systems 2, which include endless tracks 3.

Figure 2:
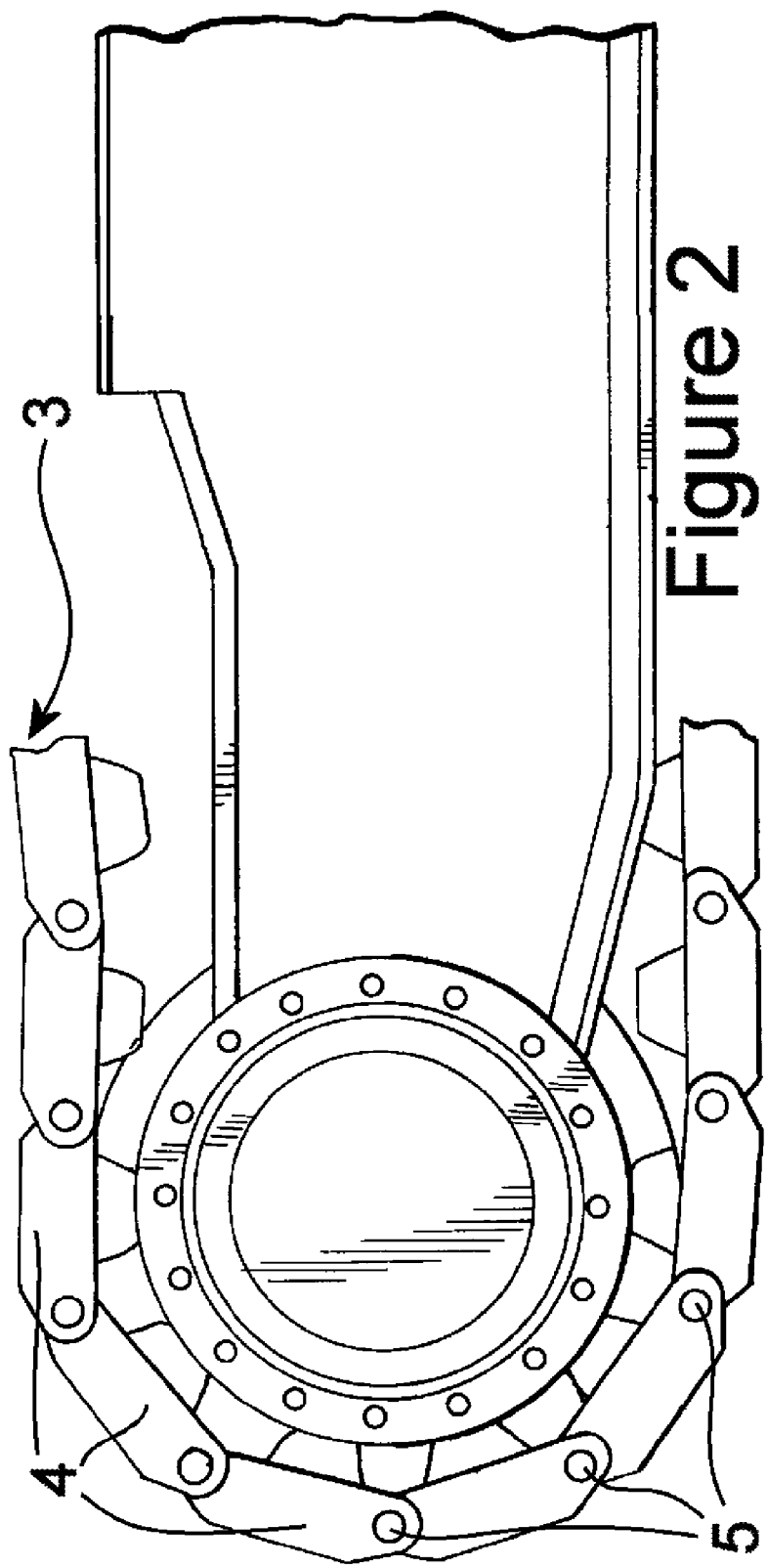
FIG. 2 depicts a section of a crawler track system including the endless track.
Figure 3:
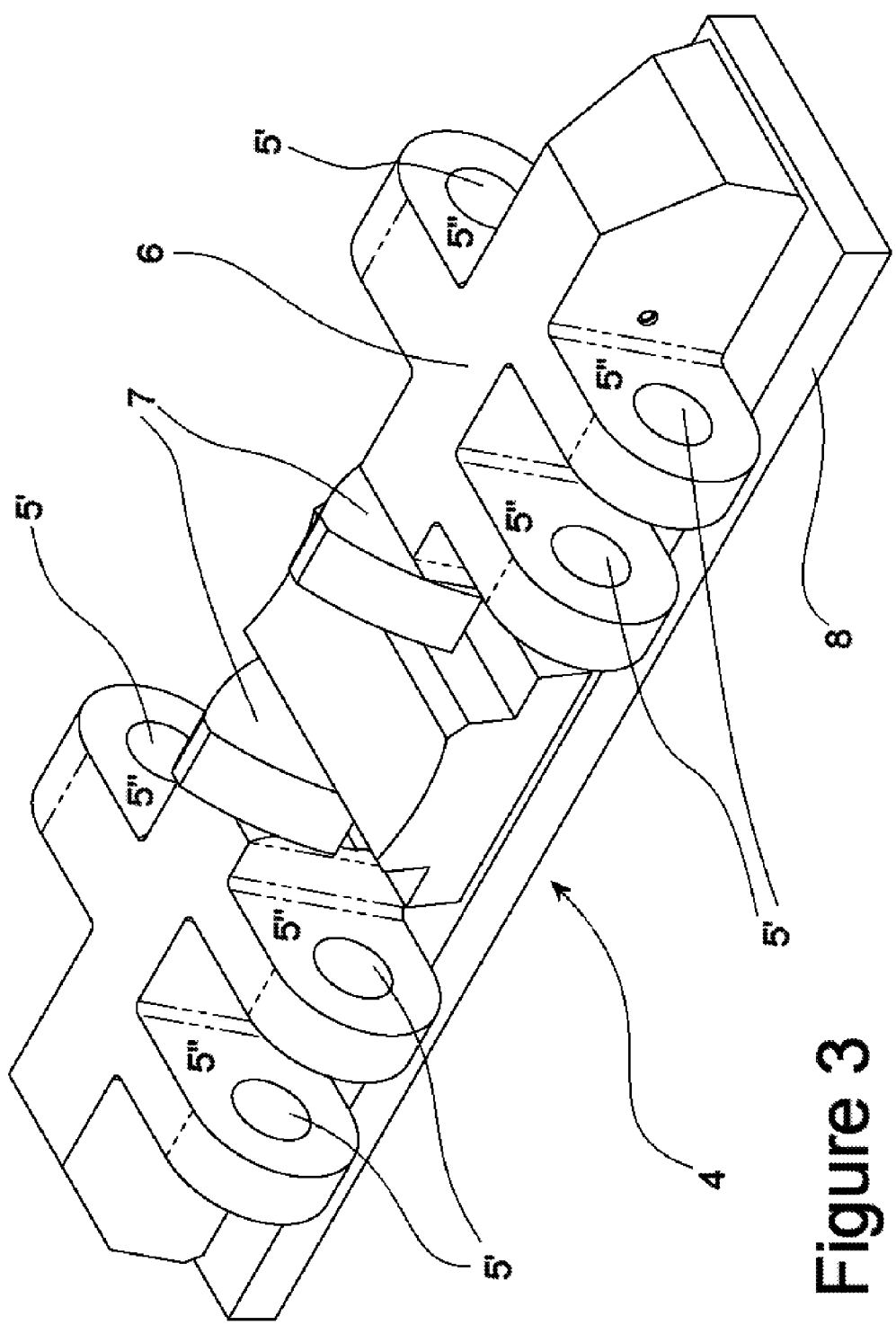
FIG. 3 depicts a track shoe of the present invention.

FIG. 2 depicts a section of a crawler track system 2, including the endless track 3. The endless track 3, includes multiple track shoes 4, which are linked together by hinge pins 5. FIG. 3 depicts a track shoe 4 of the present invention. The track shoe is comprised of multiple components, the shoe base 6, one or more drive lugs 7, and a wear plate 8. The shoe base 6 and the wear plate 8 may be formed from a single piece. The entire track shoe 4 may be formed as a single piece.

The shoe base has multiple hinge flanges 5", through which hinge pin holes 5' are cut. The shoe base is designed such that each shoe base can be connected in series with additional shoe bases to form the full endless track. Hinge flanges 5" from one shoe are mated with the complementary hinge flanges 5" of the next shoe and a hinge pin 5 is inserted in the hinge pin holes 5' to form the hinge joint between shoes.

Figure 4:
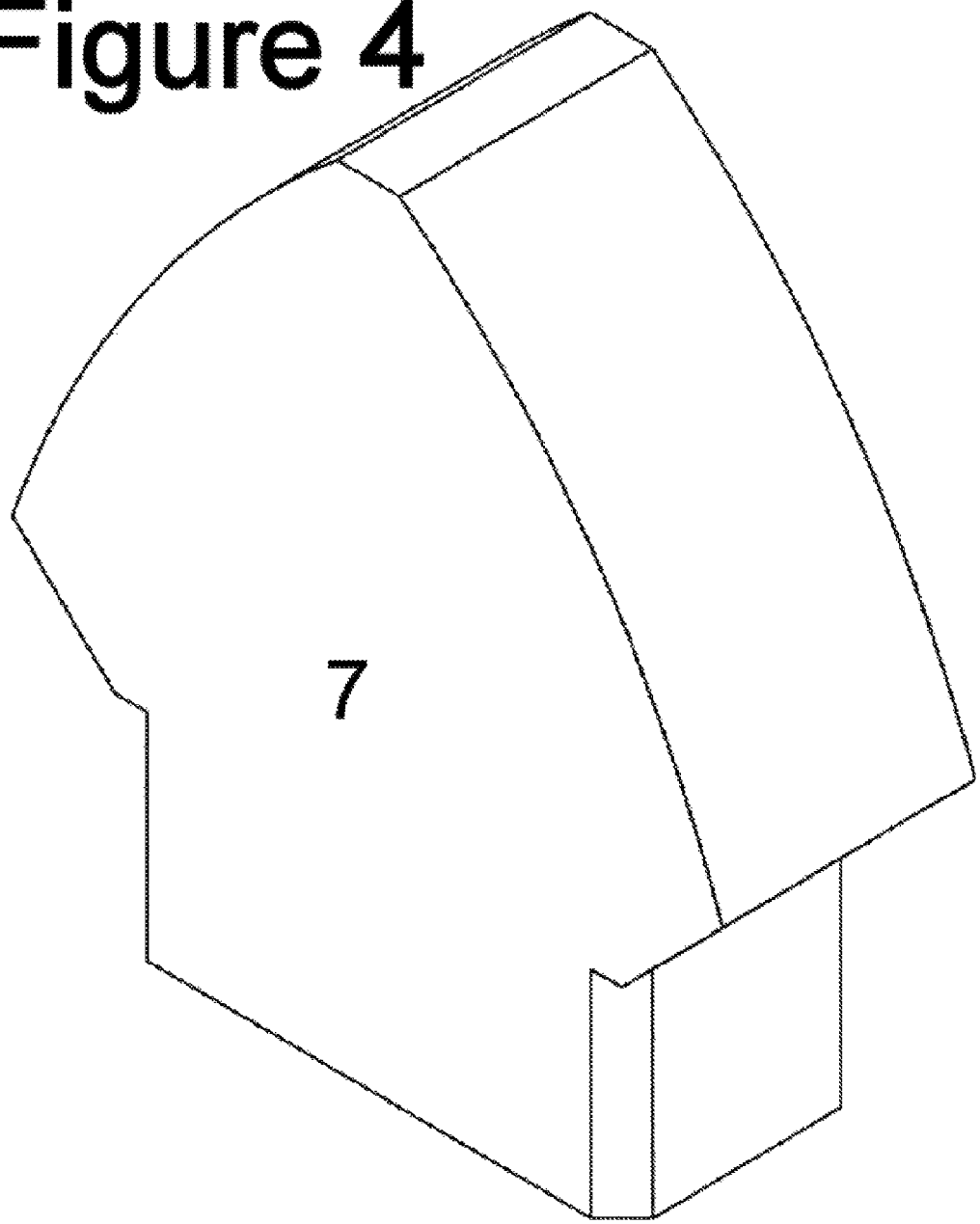
FIG. 4 depicts an example of a drive lug used on the track shoe of present invention.

The drive lugs 7 of the shoes are sequentially engaged by the drive gears of the endless crawler track system 2 to propel the vehicle. The drive lugs 7 may be created separately from the shoe base 6 and attached thereto. This allow the lugs 7 to be replaced independent of the shoe base 6 when the lugs have become too worn, thus the shoe base can be reused, at a significant cost savings over single piece units. The preferred method of attaching the lugs 7 is by welding, but any other form of attachment is contemplated, such as, for example only, bolts or other such fasteners. An example of a drive lug 7 is shown in FIG. 4. Alternatively, the drive lugs 7 and the shoe base 6 may be formed as a single piece.

Figure 5:
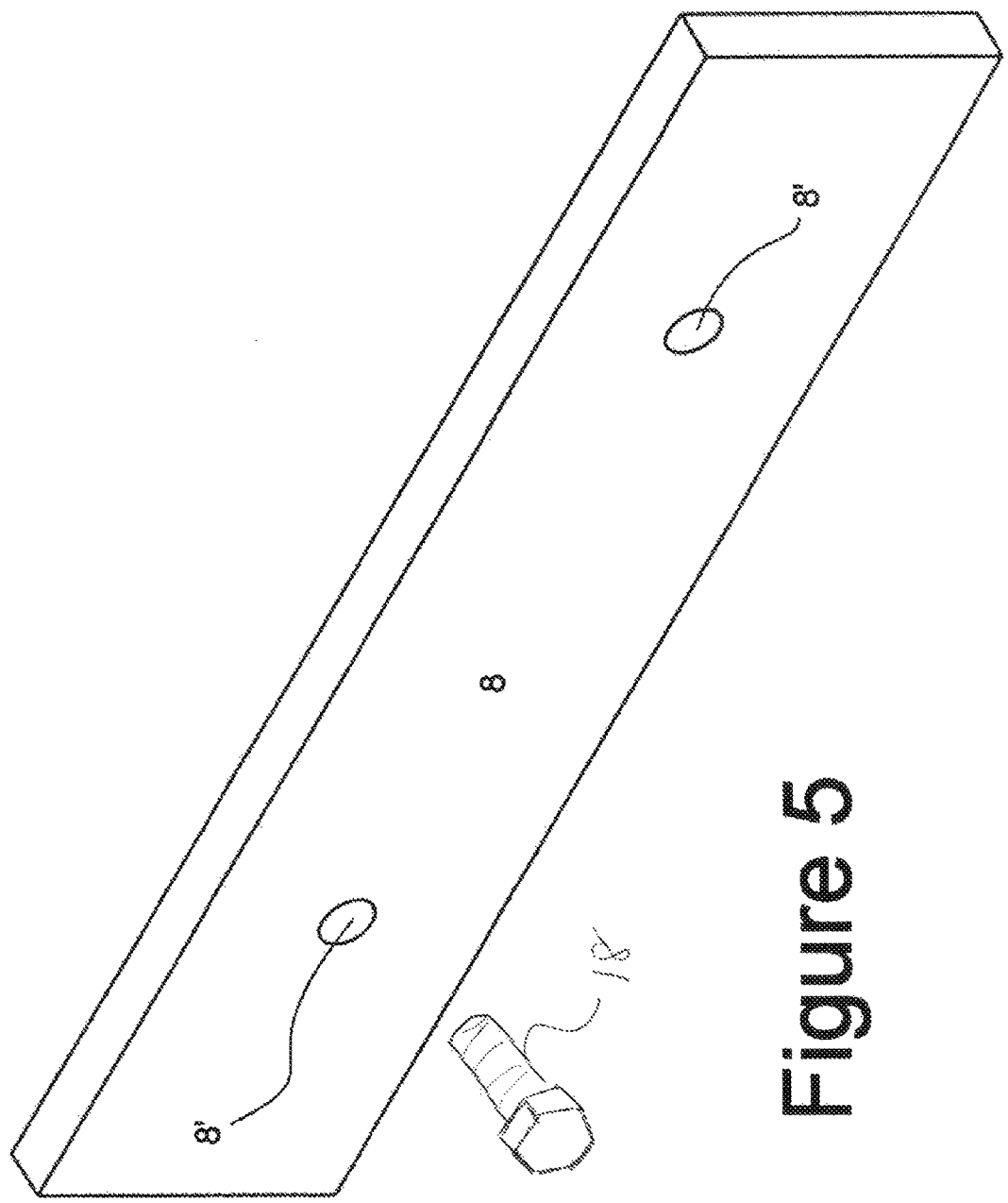
FIG. 5 depicts an example of a wear plate used on the track shoe of present invention.

The track shoe includes a wear plate 8 attached to the track shoe base 6. The wear plate 8 may be attached to the track shoe base 6 on a surface opposite to that which the drive lugs 7 are attached. As with the drive lugs 7, the wear plate 8 may be created as a separate component and attached to the shoe base 6. This, again, allows for replacement of the wear plate, when it is too worn, the shoe base, once again being reused. The wear plate 8 can be attached to the shoe base 6 by any form of attachment, but the preferred method is by bolts 18 or other such fasteners which allow for easy removal and replacement of the wear plate 8. Welding could also be used, but replacement would be more difficult and the large area welding may change the physical properties of both the wear plate 8 and the shoe base 6. A wear plate 8 is depicted in FIG. 5. Specifically shown are holes 8' through which mounting bolts or other such hardware may pass to attach the wear plate 8 to the shoe base 6.

The shoe base 6 and drive lugs 7 are preferably formed from a prehardened engineering steel such as, for example, MECASTEEL 145 (a tradename used by Industeel USA LLC). MECASTEEL 145 is a steel grade delivered in prehardened condition. It can replace conventional steels, such as AISI 4330 for example in the manufacture of massive steel components (machines, hydraulic systems, frac pumps, etc.) Its unique chemistry and heat treatment process enable very consistent mechanical properties throughout the whole blocks, even for the heaviest gauge. Consequently, the steel does not require any further hardening after machining, allowing for substantial cost savings.

The MECASTEEL 145 is delivered prehardened, normalized, quenched and double tempered. The chemical analysis in weight % is shown in Table 1.

TABLE 1

| C | Smax | P max | Si max | Mn max | Cr | Ni | Mo | V | Other |
|---|------|-------|--------|--------|-----|-----|-----|------|-------|
| 0.25-0.30 | 0.010 | 0.010 | 0.25 | 0.5 | 1.0-1.5 | 3.0-3.5 | 0.6-0.9 | 0.08-0.12 | B |

The steel has the following mechanical properties (in delivery condition):
1) Hardness 350-390 HB;
2) Yield strength of $\geq 1000$ MPa;
3) Ultimate tensile strength of $\geq 1103$ MPa;
4) Elongation of $\geq 15\%$; and
5) Reduction of area $\geq 35\%$.

In the present application, a block of MECASTEEL 145 is machined to form the shoe base 6 and any separate drive lugs 7. The steel is prehardened and its properties do not change significantly after machining. No subsequent hardening process is required and the track shoe is ready to use as soon as it is created. Alternatively any two or all three of the shoe components (shoe base 6, drive lugs 7 and wear plate 8) may be machined from a single piece of MECASTEEL 145.

The wear plate may be formed of MECASTEEL 145 or Creusabro® 8000 (a registered trademark of Industeel USA LLC). Creusabro® 8000 is an advanced abrasion-resistant steel with a better compromise, in extreme applications, between abrasion resistance and toughness (crack resistance). It has more than 50% greater wear life than conventional 500 HB water quenched steels. Creusabro® 8000 has a unique chemical analysis which is combined with a dedicated heat treatment conducted by oil quenching.

Creusabro® 8000 is successfully used as wear parts in different areas of industries. It has a superficial hardening followed by very efficient work hardening while in service. The work hardening is provided by a metallurgic phenomenon called Transformation Induced by Plasticity (TRIP effect). In TRIP steels, the initial microstructure is not fully martensitic. The original microstructure of Creusabro® 8000 material, in the as-delivered state, is a balanced mixture of Martensite, Bainite and retained Austenite (within a range of 8% to 10%). This gives the Creusabro® 8000 the ability to work-harden when submitted to local plastic deformation in service. Plastic deformation induces a surface hardening phenomenon by transformation of retained austenite into fresh and very hard martensite while the material remains ductile underneath. This allows the steel to be most effective at withstanding both abrasion and heavy impact while in service.

The steel also has a very fine and homogeneous dispersion of hard particles (mainly chromium, molybdenum and titanium microcarbides) giving the material its extremely high abrasion resistance. The fine microstructure of Creusabro® 8000 is a result of it's specific chemical composition combined with a controlled cooling rate through oil quenching. This microstructure differs from the rough acicular lamellar structure which is typical of the fully martensitic steels (conventional 500 HB water quenched steels). Moreover, the fine and homogeneous dispersion of micro carbides significantly contributes to improve the reinforcement of the matrix by improving the sliding wear resistance in service.

In addition to its high wear resistance, Creusabro® 8000 is amenable to processing (forming, machining, etc.) much more so than existing 500 HB resistant steels. The chemical analysis of Creusabro® 8000 is given in Table 2.

TABLE 2

| C | Mn | Ni | Cr | Mo | S |
|---|-----|-----|-----|-----|---|
| $\leq 0.28$ | $\leq 1.6$ | $\approx 0.40$ | $\leq 1.6$ | $\geq 0.20$ | $\leq 0.002$ |

The inventive track shoe 4 of the present invention, with its MECASTEEL 145 shoe base 6 and drive lugs 7, and its MECASTEEL 145 or Creusabro® 8000 wear plate 8 has an estimated service life of about 25,000 hours. This reduces the replacement costs for the track shoes on the 5 shovels operating at Mount-Wright mine by about $2.5 million per year.

Thus, while an embodiment of the present invention has been described herein, those with skill in this art will recognize changes, modifications, alterations and the like which still shall come within the spirit of the inventive concept, and such are intended to be included within the scope of the invention as expressed in the following claims.

The invention claimed is:

1. A track shoe for a track drive system, said track shoe comprising:
a shoe base,
at least one drive lug attached to said shoe base, and
a wear plate attached to said shoe base,
the shoe base being formed from a prehardened engineering steel having a composition of, in % by weight:
$0.25 \leq C \leq 0.30$,
$1.0 \leq Cr \leq 1.5$,
$3.0 \leq Ni \leq 3.5$,
$0.6 \leq Mo \leq 0.9$,
$0.08 \leq V \leq 0.12$,
$S \leq 0.010$,
$P \leq 0.010$,
$Si \leq 0.25$, and
$Mn \leq 0.5$,
the remainder being substantially iron and impurities resulting from production.

2. The track shoe of claim 1, said at least one drive lug is formed from the prehardened engineering steel.

3. The track shoe of claim 1, wherein said prehardened engineering steel further comprises boron.

4. The track shoe of claim 1, wherein said prehardened engineering steel has:
a hardness of 350-390 HB; an ultimate tensile strength of $\geq 1103$ MPa; an elongation of $\geq 15\%$; and a reduction of area $\geq 35\%$.

5. The track shoe of claim 4, wherein said prehardened engineering steel has a yield strength of $\geq 1000$ MPa.

6. The track shoe of claim 4, wherein said shoe base and said at least one drive lug are formed by machining them from one or more blocks of said prehardened engineering steel.

7. The track shoe of claim 1, wherein said at least one drive lug is replaceably attached to said shoe base.

8. The track shoe of claim 1, wherein said at least one drive lug is attached to said shoe base by welding.

9. The track shoe of claim 1, wherein said wear plate is replaceably attached to said shoe base.

10. The track shoe of claim 1, wherein said wear plate is replaceably attached to said shoe base by bolts.

11. The track shoe of claim 1, wherein said wear plate is formed from an abrasion-resistant steel having a hardness of from 430 to 500 HB.

12. The track shoe of claim 11, wherein said advanced abrasion-resistant steel is a TRIP steel which has a microstructure comprised of a mixture of Martensite, Bainite and retained Austenite, said retained Austenite within a range of 8% to 10%.

13. The track shoe of claim 12, wherein said advanced abrasion-resistant steel also contains a very fine and homogeneous dispersion of hard particles, which are primarily formed of chromium, molybdenum and titanium microcarbides, said homogeneous dispersion of hard particles giving the material its extremely high abrasion resistance.

14. The track shoe of claim 11, wherein said advanced abrasion-resistant steel has a composition of, in weight %:

$C \leq 0.28$,
$Mn \leq 1.6$,
$Ni\ 0.40$,
$Cr \leq 1.6$,
$Mo \geq 0.20$, and
$S \leq 0.002$, with the remainder being substantially iron.

15. The track shoe of claim 11, wherein said advanced abrasion-resistant steel has a composition of, in weight %:

$C \leq 0.28$,
$Mn \leq 1.6$,
$Ni \leq 1.0$,
$Cr \leq 1.6$,
$S \leq 0.005$,
$P \leq 0.018$, and
$Mo \leq 0.40$.

16. The track shoe of claim 1, wherein said wear plate is formed from the prehardened engineering steel.

17. The track shoe of claim 16, wherein said shoe base and said wear plate are formed together as a single piece from the prehardened engineering steel.

18. The track shoe of claim 1, wherein said shoe base, said at least one drive lug, and said wear plate are formed together as a single piece from the prehardened engineering steel.

* * * * *